(12) United States Patent
Mills et al.

(10) Patent No.: US 6,425,027 B1
(45) Date of Patent: Jul. 23, 2002

(54) MODULAR COMPACTPCI BACKPLANE

(75) Inventors: Jason Mills; Bradley Siim, both of Waterloo (CA)

(73) Assignee: Cisco Systems Canada Co., Nova Scotia (CA)

( * ) Notice: Subject to any disclaimer, the term of this patent is extended or adjusted under 35 U.S.C. 154(b) by 0 days.

(21) Appl. No.: 09/538,733

(22) Filed: Mar. 30, 2000

Related U.S. Application Data

(60) Provisional application No. 60/126,843, filed on Mar. 30, 1999.

(51) Int. Cl.$^7$ .............................................. G06F 13/00
(52) U.S. Cl. ..................................................... 710/101
(58) Field of Search ............................. 307/11, 36, 42; 710/101, 102, 103, 117, 128

(56) References Cited

U.S. PATENT DOCUMENTS

| 5,721,458 A | * | 2/1998 | Kearney et al. | ............. | 307/150 |
| 5,951,659 A | * | 9/1999 | McElroy et al. | ............. | 710/101 |
| 6,222,708 B1 | * | 4/2001 | Severson et al. | ............. | 361/2 |

OTHER PUBLICATIONS

"PCI Local Bus Specification", Revision 2.2, Dec. 18, 1998, PCI Special Interest Group, 322 pages.
"CompactPCI™ Specification", PICMG 2.0 R2.20, Jun. 17, 1997, PCI Industrial Computers, 62 pages.
"PS1110, PS1111 & PS1112 CompactPCI® Bridges, PCI Bridge Card Overview", Pixel Scientific, Feb. 98, 9 pages.
Muraglia, Philippe: "Scaleable CompactPCI", reprinted from CompactPCI Systems, Winter 1998, 2 pages.
"DXL Backplanes, Compact–PCI Backplane Dimensions", downloaded from http://www.dxl.com/backplan1.htm on May 20, 1999, 2 pages.

PCI Industrial Computers Manufacturers Group PICMG2.0 R2.20 CompactCPI Specification, Jun. 17, 1997, 322 pages Wakefield, MA USA.
PCI Special Interest Group PCI Local Bus Specification, Revision 2.2, Dec. 18, 1998, 62 pp Hillsboro, Oregon USA.
Pixel Scientific Data Sheets on the PS1110/1111/1112 CompactCPI Bridges, Feb. 1998 10 pages, Waterloo, Ontario Canada.
"APW Electronic Solutions, CompactPCI: Expansion bridge modules", CompactPCI expansion bridge assembly specifications, Oct. 1998, one page.
"C–MAC Interconnect CompactPCI", C–MAC Interconnect Compact PCI backplane features, C–MAC of America, Inc., Oct. 1998, 2 pages.

* cited by examiner

Primary Examiner—Matthew Nguyen
(74) Attorney, Agent, or Firm—Beyer, Weaver & Thomas, LLP

(57) ABSTRACT

The current invention is a backplane of an industrial computer that comprises two or more modular backplane segments that each comprise front loading slots for the insertion of Peripheral Boards. The modular backplane segments also comprise slots on the back side for the insertion of rear mounting boards. Each modular backplane segment comprise a PCI compliant bus. The buses of the modular backplanes are bridged by a bridging module that attaches to the back side of the backplane segments being bridged. The power for the backplane is provided by one or more power supply backplane segments each accepting one or more power supply modules. The modular backplane of the current invention allows the number of slots of the backplane to be determined by the user. Further, by attaching the bridging modules to the back side of the backplane the maximum number of slots for the insertion of boards is available on the front side.

15 Claims, 16 Drawing Sheets

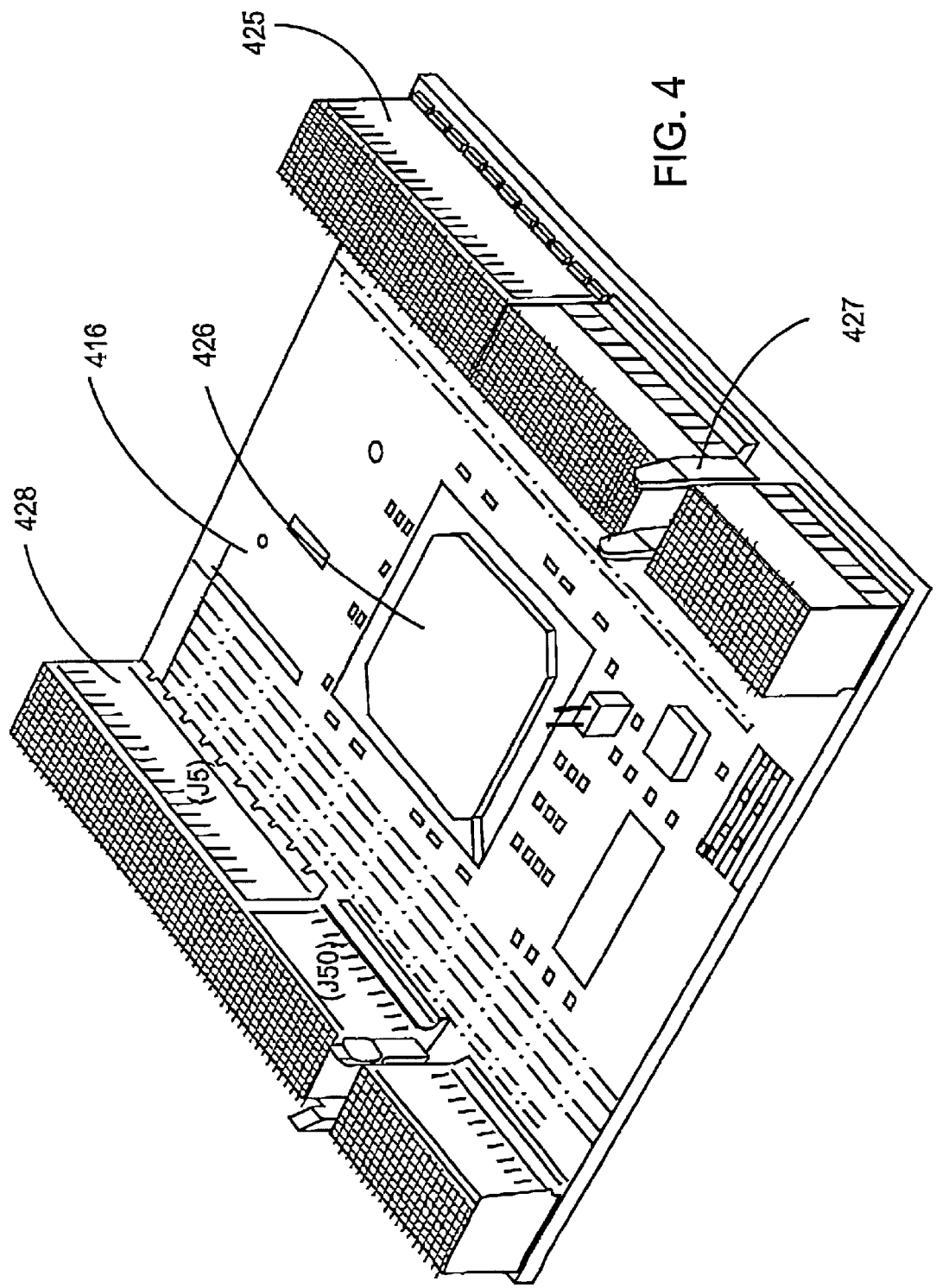

|  | ROW | Column | | | | | | |
|---|---|---|---|---|---|---|---|---|
|  |  | Z | A | B | C | D | E | F |
| J49 | 22 | GND | N/C | N/C | N/C | N/C | N/C | GND |
|  | 21 | GND | N/C | N/C | N/C | N/C | N/C | GND |
|  | 20 | GND | N/C | N/C | N/C | GND | N/C | GND |
|  | 19 | GND | N/C | N/C | N/C | N/C | N/C | GND |
|  | 18 | GND | BRSVP2A18 | BRSVP2B18 | BRSVP2C18 | GND | BRSTP2E18 | GND |
|  | 17 | GND | BRSVP2A17 | GND | PRST# | N/C | N/C | GND |
|  | 16 | GND | BRSVP2A16 | BRSVP2B16 | DEG# | GND | BRSVP2E216 | GND |
|  | 15 | GND | BRSVP2A15 | GND | FAL# | REQ | GNT | GND |
|  | 14 | GND | AD[35] | AD[34] | AD[33] | GND | AD[32] | GND |
|  | 13 | GND | AD[38] | GND | V(I/O) | AD[37] | AD[36] | GND |
|  | 12 | GND | AD[42] | AD[41] | AD[40] | GND | AD[39] | GND |
|  | 11 | GND | AD[45] | GND | V(I/O) | AD[44] | AD[43] | GND |
|  | 10 | GND | AD[49] | AD[48] | AD[47] | GND | AD[46] | GND |
|  | 9 | GND | AD[52] | GND | V(I/O) | AD[51] | AD[50] | GND |
|  | 8 | GND | AD[56] | AD[55] | AD[54] | GND | AD[53] | GND |
|  | 7 | GND | AD[59] | GND | V(I/O) | AD[58] | AD[57] | GND |
|  | 6 | GND | AD[63] | AD[62] | AD[61] | GND | AD[60] | GND |
|  | 5 | GND | C/BE(5)# | GND | V(I/O) | C/BE(4)# | PAR64 | GND |
|  | 4 | GND | V(I/O) | BRSVP2B4 | C/BE(7)# | GND | C/BE(6)# | GND |
|  | 3 | GND | N/C | GND | N/C | N/C | N/C | GND |
|  | 2 | GND | N/C | CLK | N/C | N/C | N/C | GND |
|  | 1 | GND | N/C | GND | N/C | N/C | N/C | GND |
| J2 | 25 | GND | 5V | REQ64# | ENUM# | 3.3V | 5V | GND |
|  | 24 | GND | AD[1] | 5V | V(I/O) | AD[0] | ACK64# | GND |
|  | 23 | GND | 3.3V | AD[4] | AD[3] | 5V | AD[2] | GND |
|  | 22 | GND | AD[7] | GND | 3.3V | AD[6] | AD[5] | GND |
|  | 21 | GND | 3.3V | AD[9] | AD[8] | M66EN | C/BE(0)# | GND |
|  | 20 | GND | AD[12] | GND | V(I/O) | AD[11] | AD[10] | GND |
|  | 19 | GND | 3.3V | AD[15] | AD[14] | GND | AD[13] | GND |
|  | 18 | GND | SERR# | GND | 3.3V | PAR | C/BE(1)# | GND |
|  | 17 | GND | 3.3V | N/C | N/C | GND | PERR# | GND |
|  | 16 | GND | DEVSEL# | GND | V(I/O) | STOP# | LOCK# | GND |
|  | 15 | GND | 3.3V | FRAME# | IRDY# | BD SEL# | TRDY# | GND |
|  | 14 | KEY | KEY | KEY | KEY | KEY | KEY | KEY |
|  | 13 | KEY | KEY | KEY | KEY | KEY | KEY | KEY |
|  | 12 | KEY | KEY | KEY | KEY | KEY | KEY | KEY |
|  | 11 | GND | AD[18] | AD[17] | AD[16] | GND | C/BE(2)# | GND |
|  | 10 | GND | AD[21] | GND | 3.3V | AD[20] | AD[19] | GND |
|  | 9 | GND | C/BE(3)# | IDSEL | AD[23] | GND | AD[22] | GND |
|  | 8 | GND | AD[26] | GND | V(I/O) | AD[25] | AD[24] | GND |
|  | 7 | GND | AD[30] | AD[29] | AD[28] | GND | AD[27] | GND |
|  | 6 | GND | N/C | GND | 3.3V | N/C | AD[31] | GND |
|  | 5 | GND | BRSVP1A5 | BRSVP1B5 | RST# | GND | N/C | GND |
|  | 4 | GND | BRSVP1A4 | N/C | V(I/O) | N/C | N/C | GND |
|  | 3 | GND | INTA# | INTB# | INTC# | 5V | INTD# | GND |
|  | 2 | GND | N/C | 5V | N/C | N/C | N/C | GND |
|  | 1 | GND | 5V | -12V | N/C | +12V | 5V | GND |

FIG. 5A

| | ROW | Column | | | | | | |
|---|---|---|---|---|---|---|---|---|
| | | Z | A | B | C | D | E | F |
| | 22 | GND | N/C | N/C | N/C | N/C | N/C | GND |
| | 21 | GND | CLK6 | GND | N/C | N/C | N/C | GND |
| | 20 | GND | CLK5 | GND | N/C | GND | N/C | GND |
| | 19 | GND | GND | GND | N/C | N/C | N/C | GND |
| | 18 | GND | BRSVP2A18 | BRSVP2B18 | BRSVP2C18 | GND | BRSTP2E18 | GND |
| | 17 | GND | BRSVP2A17 | GND | PRST# | REQ6# | GNT6# | GND |
| | 16 | GND | BRSVP2A16 | BRSVP2B16 | DEG# | GND | BRSVP2E216 | GND |
| | 15 | GND | BRSVP2A15 | GND | FAL# | REQ5# | GNT5# | GND |
| | 14 | GND | AD[35] | AD[34] | AD[33] | GND | AD[32] | GND |
| | 13 | GND | AD[38] | GND | V(I/O) | AD[37] | AD[36] | GND |
| J51 | 12 | GND | AD[42] | AD[41] | AD[40] | GND | AD[39] | GND |
| | 11 | GND | AD[45] | GND | V(I/O) | AD[44] | AD[43] | GND |
| | 10 | GND | AD[49] | AD[48] | AD[47] | GND | AD[46] | GND |
| | 9 | GND | AD[52] | GND | V(I/O) | AD[51] | AD[50] | GND |
| | 8 | GND | AD[56] | AD[55] | AD[54] | GND | AD[53] | GND |
| | 7 | GND | AD[59] | GND | V(I/O) | AD[58] | AD[57] | GND |
| | 6 | GND | AD[63] | AD[62] | AD[61] | GND | AD[60] | GND |
| | 5 | GND | C/BE(5)# | GND | V(I/O) | C/BE(4)# | PAR64 | GND |
| | 4 | GND | V(I/O) | BRVP2B4 | C/BE(7)# | GND | C/BE(6)# | GND |
| | 3 | GND | CLK4 | GND | GNT3# | REQ4# | GNT4# | GND |
| | 2 | GND | CLK2 | CLK3 | SYSEN# | GNT2# | REQ3# | GND |
| | 1 | GND | CLK1 | GND | REQ1# | GNT1# | REQ2# | GND |
| | 25 | GND | 5V | REQ64# | ENUM# | N/C | 5V | GND |
| | 24 | GND | AD[1] | 5V | V(I/O) | AD[0] | ACK64# | GND |
| | 23 | GND | 3.3V | AD[4] | AD[3] | 5V | AD[2] | GND |
| | 22 | GND | AD[7] | GND | 3.3V | AD[6] | AD[5] | GND |
| | 21 | GND | 3.3V | AD[9] | AD[8] | M66EN | C/BE(0)# | GND |
| | 20 | GND | AD[12] | GND | V(I/O) | AD[11] | AD[10] | GND |
| | 19 | GND | 3.3V | AD[15] | AD[14] | GND | AD[13] | GND |
| | 18 | GND | SERR# | GND | 3.3V | PAR | C/BE(1)# | GND |
| | 17 | GND | 3.3V | SDONE | SBO# | GND | PERR# | GND |
| | 16 | GND | DEVSEL# | GND | V(I/O) | STOP# | LOCK# | GND |
| | 15 | GND | 3.3V | FRAME# | IRDY# | GND | TRDY# | GND |
| | 14 | KEY | KEY | KEY | KEY | KEY | KEY | KEY |
| J50 | 13 | KEY | KEY | KEY | KEY | KEY | KEY | KEY |
| | 12 | KEY | KEY | KEY | KEY | KEY | KEY | KEY |
| | 11 | GND | AD[18] | AD[17] | AD[16] | GND | C/BE(2)# | GND |
| | 10 | GND | AD[21] | GND | 3.3V | AD[20] | AD[19] | GND |
| | 9 | GND | C/BE(3)# | N/C | AD[23] | GND | AD[22] | GND |
| | 8 | GND | AD[26] | GND | V(I/O) | AD[25] | AD[24] | GND |
| | 7 | GND | AD[30] | AD[29] | AD[28] | GND | AD[27] | GND |
| | 6 | GND | REQ0# | GND | 3.3V | CLK0 | AD[31] | GND |
| | 5 | GND | BRSVP1A5 | BRSVP1B5 | RST# | GND | GNT0# | GND |
| | 4 | GND | BRSVP1A4 | N/C | V(I/O) | N/C | N/C | GND |
| | 3 | GND | INTA# | INTB# | INTC# | 5V | INTD# | GND |
| | 2 | GND | N/C | 5V | N/C | N/C | N/C | GND |
| | 1 | GND | 5V | N/C | N/C | N/C | 5V | GND |

FIG. 5B

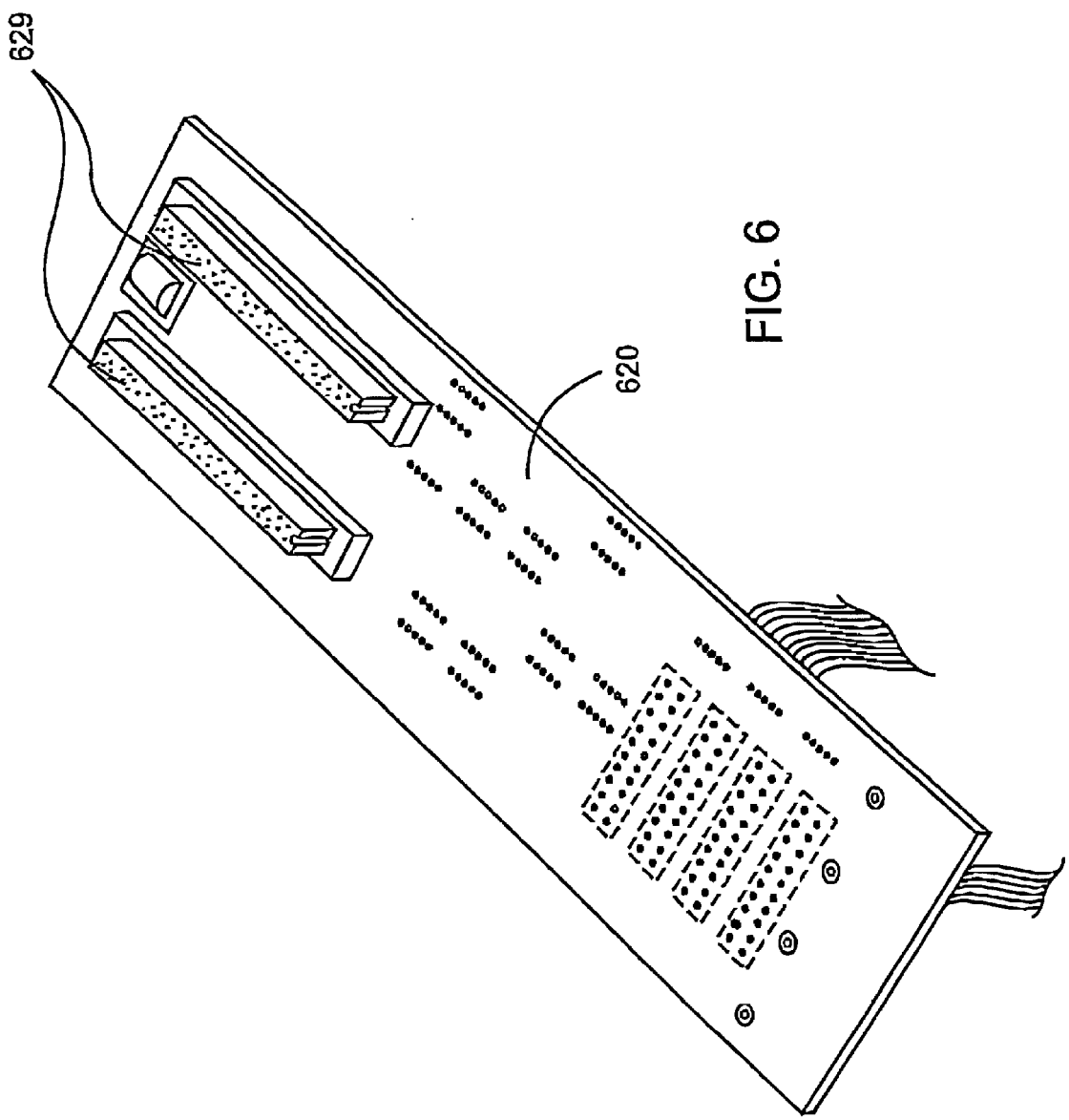

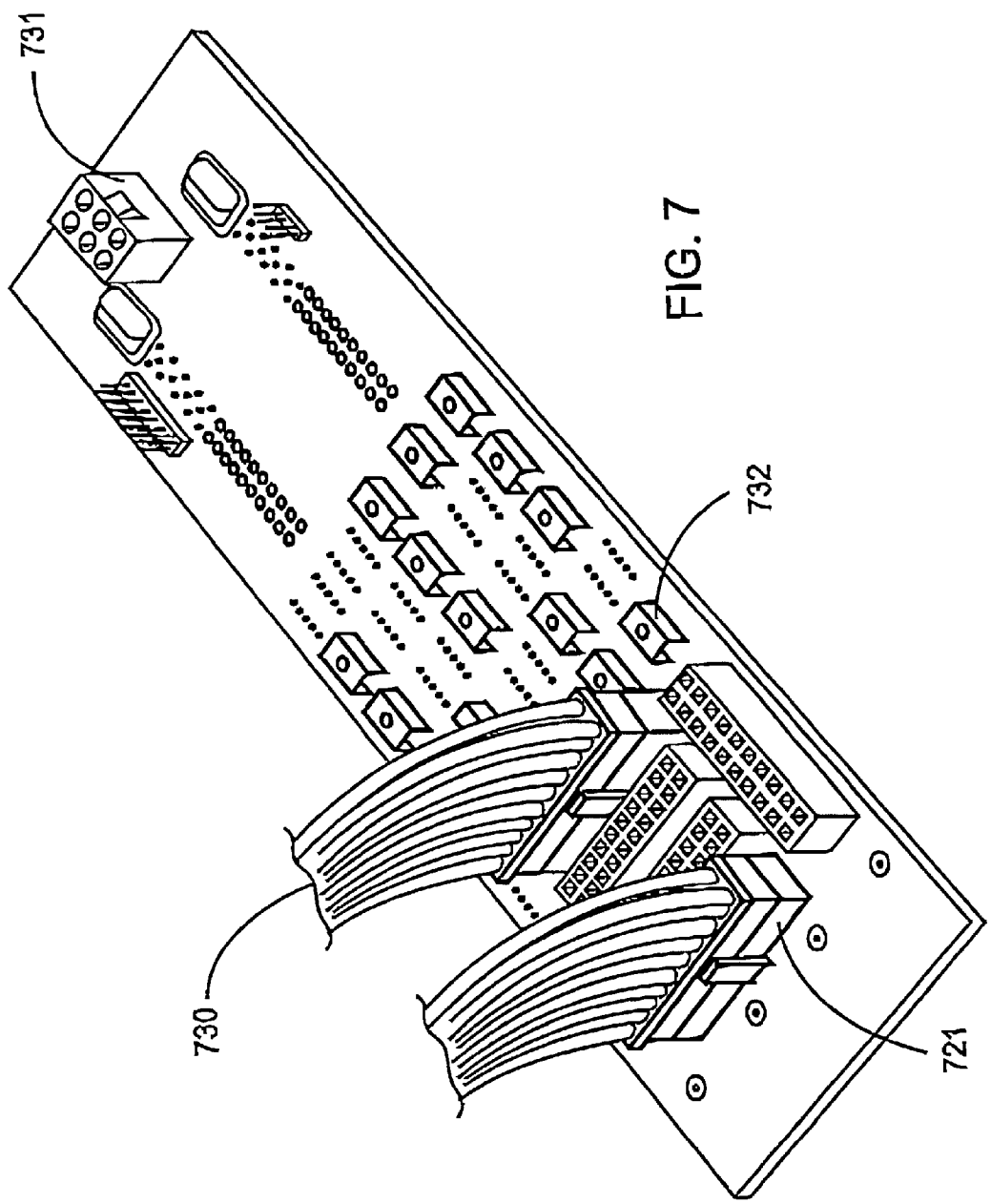

| Jumper Reference Designator | Factory Default | System Slot Board in rightmost slot (CLK0-4 generated) | System Slot Board in rightmost slot (CLK0-6 generated) | Peripheral Board in rightmost slot (backplane segment driven by rear mounted bridge in rightmost slot) |
|---|---|---|---|---|
| JP70 | 1 & 2 shorted | 1 & 2 shorted | 1 & 2 shorted | 2 & 3 shorted |
| JP21 | 2 & 3 shorted | 2 & 3 shorted | 2 & 3 shorted | 1 & 2 shorted |
| JP10 | 1 & 2 shorted | 1 & 2 shorted | 2 & 3 shorted | 2 & 3 shorted |
| JP16 | 1 & 2 shorted | 1 & 2 shorted | 2 & 3 shorted | 2 & 3 shorted |

FIG. 9A

| Jumper Reference Designator | Factory Default | System Slot Board in rightmost slot (CLK0-4 generated) | System Slot Board in rightmost slot (CLK0-6 generated) | Peripheral Board in rightmost slot (backplane segment driven by rear mounted bridge in rightmost slot) |
|---|---|---|---|---|
| JP70 | Shorted | Shorted | Shorted | Open |
| JP10 | 1 & 2 shorted | 1 & 2 shorted | 1 & 2 shorted | 2 & 3 shorted |
| JP16 | 1 & 2 shorted | 1 & 2 shorted | 2 & 3 shorted | 2 & 3 shorted |

FIG. 9B

MODULAR COMPACTPCI BACKPLANE

CONTINUING DATA

This application claims benefit of application Ser. No. 60/126,843 filed on Mar. 30, 1999.

FIELD OF THE INVENTION

The invention relates generally to computers and the communication pathways within them. It more particularly relates to the backplane of an industrial computer having several segments that conform to the Compact Peripheral Component Interconnect (CompactPCI) Specification and the apparatus used to connect these segments to form a continuous bus across the entire backplane

BACKGROUND OF THE INVENTION

A pathway that provides data communication between two elements of an electric circuit is known as a bus. Buses are used for both communications within the integrated circuits and between the integrated circuits. An important example of the latter is the communication between the Central Processing Unit (CPU) and peripheral components. One of the earliest standards for this type of bus is the Industrial Standard Association (ISA) bus that was developed by IBM in 1984. This bus is 16 bits wide and worked well for early peripheral components with modest bandwidth requirements. However, as the amount of data from peripheral components began to grow the bus became the 'bottleneck' in the system. This problem was reduced with the introduction of wider and faster local bus standards. As the speed (frequency) of the bus is increased the physical length of the communication path must be reduced. One current standard local bus is the Peripheral Component Interconnect (PCI) bus LOCI Local Bus Specification, Revision 2.2, Dec. 18, 1998). The PCI bus standard is well suited for personal computers. Industrial computers are however quite different than personal computers. They often use a rack-based chassis. Peripheral components (boards) are inserted into connectors that are located on the backplane at the back of the chassis. The backplane provides a physical connection for the peripheral boards. It also provides electrical connections including power and busing. There are numerous limitations of the PCI bus Specification that make the bus impractical for industrial computers. These limitations include the physical requirements of the bus (e.g. maximum length of several inches), the limitation of a maximum of four slots for peripheral components. Other limitations of the PCI bus standard include connectors that are not robust enough for industrial applications where components are inserted and removed quite often and connectors that present parasitic capacitance on the bus, which tends to limit the number of slots that can be used. However, it is important to maintain PCI Specification compatibility for the bus in industrial computers to access the vast array of integrated circuits that are manufactured for the personal computer market to the PCI Specification.

The CompactPCI Specification was prepared by the PCI Industrial Computer Manufacturers Group (PICMG™) to provide a standard form factor for industrial computers that employs mechanically robust connectors and has a bus that conforms to the PCI Specification. These and other of the features of the CompactPCI Specification are outlined in PICMG 2.0 R2.20—CompactPCI Specification—Jun. 17, 1997, ©1995, 1996, 1997 PCI Industrial Computers Manufacturers Group.

The CompactPCI Specification defines that the PCI compliant bus has a maximum of eight electrical loads. This implies tat the backplane has a maximum of eight slots. Because a System Slot Board is required for the bus a CompactPCI backplane consists of one System Slot (containing e System Slot Board) and up to seven Peripheral Slots for Peripheral Boards. The System Slot Board is responsible for performing system initialization, providing bus arbitration and clock distribution for all boards on the segment. Physically, the System Slot shall be located on either end of the CompactPCI bus segment.

The restriction of eight physical slots (electrical loads) is restrictive for many industrial computers. There are three common approaches for the provision of more Than eight slots on a backplane.

First, the user can purchase two or more 8-slot backplanes and connect them via a standard interface (e.g. LAN, a fibre optic link, etc.). In this case, each CompactPCI bus segment must have its own System Slot Board and must also house the above interface board. It is apparent to those skilled in the art that this can be expensive in terms of both hardware and software, and wasteful in terms of physical space.

Second, while an individual backplane is limited to a maximum of eight slots two segments can be 'bridged' together to increase the total number of slots of the backplane. These backplane segments are contained on a single Printed Circuit Board (PCB). The bridge acts as a System Board on the secondary segment (the segment being bridged to), and as a Peripheral Board on the pi segment (the segment being bridged from). The bridge is the provision of a nearly transparent connection between the two bus segments when data must be transferred between devices on different segments. At all other times, the two segments operate independently. Unfortunately, the physical features of the CompactPCI standard have limited the transparent application of bridges due to the requirement that the bridge be connected to both CompactPCI segments at once.

There are two approaches to bridging backplane segments. The bridge circuitry can be permanently affixed directly to the backplane between groupings of up to eight slots. There is some physical space lost due to the presence of the bridge circuitry producing regions of the backplane that cannot be used for CompactPCI peripheral slots. This approach is not very flexible as a different backplane must be manufactured for each unique number of slots and bridges. Further, if the bridging circuitry fails, it can be difficult and time consuming to replace the backplane thereby causing unacceptable downtime. However, this approach is reasonably well suited to high volume applications where the requirements of the backplane are well defined.

A second approach is to place the bridging circuitry on a dedicated, removable board (bridge module). This bridge module could be of the form where it is inserted in slots on the front side of the backplane. In this case it would consume a front side slot on both the primary and secondary bus segments. This approach is very wasteful in terms of physical space since each bridge occupies two physical slots on the front side of the backplane where peripheral boards could be located.

Alternatively the bridge module could be designed to be inserted on the back side of the backplane. In this case the bridge does not consume slots on the front side of the backplane, which again is a single PCB. A special Bridge Slot could be defined which has connections to both primary and secondary segments. A bridge module installed in this slot could perform all of the required bridging functions. Because, the bridge module occupies a physical slot, eliminating a useful peripheral slot, it must use a different pin out than all other standard slots and it must be keyed so that the bridge boards cannot be installed in Peripheral Slots and vice versa. Finally, the number of signal pins available for connecting the bridge board to the backplane is limited, making some bridging arrangements awkward or impossible. This solution still requires a different backplane for each unique number of slots and bridges.

Therefore, there is a need for a modular backplane that complies with the CompactPCI Specification. A modular backplane is defined as a backplane where all of the segments are physically separate entities. This modular backplane would provide flexibility in the number of Peripheral Slots by having backplane segments on separate PCBs to be added and bridged as required. It would also be desirable for the bridging to have the same flexibility while not consuming space on the front side of the backplane that could otherwise be used for Peripheral Boards. This type of backplane would be well suited to low volume applications or research situations. The art does not provide a system that satisfies These requirements.

SUMMARY OF THE INVENTION

The invention is directed to a modular backplane for industrial computers that provides flexibility in the number of slots available for Peripheral Boards and conforms to the CompactPCI Specification. The backplane comprises two or more modular backplane segments that are connected together by one or more bridge modules to form a continuous PCI bus across the modular backplane segments.

The modular backplane segments have up to seven slots on the front side for the acceptance of front loading boards. There are up to two slots on the back side for the insertion of up to two bridge modules.

The bridge module(s) are connected to the back side of the backplane segments such that their major surface is parallel to the backplane. The bridge module comprises circuitry for receiving, processing and transmitting signals between buses. The bridge module(s) transmits signals required for the bridging of two PCI compliant buses and auxiliary signals that would normally be transmitted through the backplane. Further, the bridge is connected to the back side of the backplane segments allowing a maximum number of available slots on the front side of the segments for peripheral boards.

Finally, a power supply provides power to the backplane. This power supply may be in the form of a power backplane segment that comprises one or more power supply modules, connectors and cables for transmitting power to all of the modular backplane segments and a means for sensing the voltage levels supplied to the modular backplane segments.

Other aspects and advantages of the invention, as well as the structure and operation of various embodiments of the invention, will become apparent to those ordinarily skilled in the art upon review of the following description of the invention in conjunction with e accompanying drawings.

BRIEF DESCRIPTION OF THE DRAWINGS

The invention will be described with reference to the accompanying drawings, wherein:

FIG. 4 is a perspective view of the front of the bridge module of the backplane of FIG. 3;

FIGS. 5(a) and 5(b) show the pin out of the connectors of the bridge module connected to the Bridge Slot and System Slot, respectively;

FIG. 6 is a perspective view of the rear of the power supply backplane from the backplane assembly of FIG. 1;

FIG. 7 is a perspective view of the front of the power supply backplane from the backplane assembly of FIG. 1;

FIGS. 9(a) and (b) show the jumper configuration for seven and six slot modular backplane segments, respectively;

DETAILED DESCRIPTION OF THE INVENTION

First, an overview of the invention is provided the current invention is a backplane of an industrial computer that comprises two or more modular backplane segments that have front loading slots for the insertion of Peripheral Boards. The modular backplane segments also have slots on the back side for the insertion of rear mounting boards. Each modular backplane segment includes a PCI compliant bus, The buses of the modular backplanes are bridged by a bridging module that attaches to the back side of the backplane segments being bridged. The power for the backplane is provided by one or more power supply backplane segments each accepting one or more power supply modules.

Figure 1:
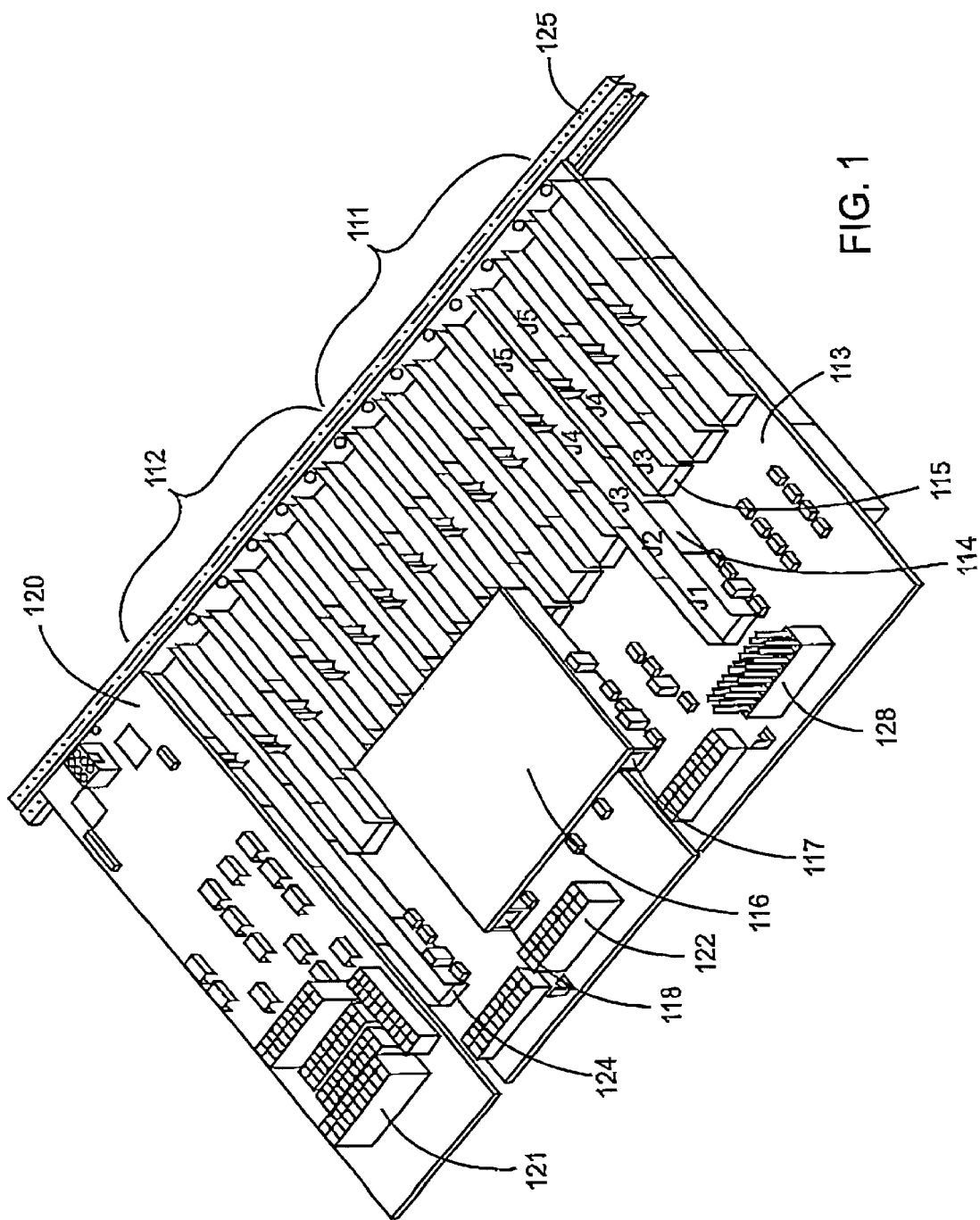
FIG. 1 is a perspective view of rear of backplane assembly in accordance with an embodiment of the present invention.

Secondly, a detailed description of the structure of the invention is provided FIG. 1 shows the back side of a modular backplane of the current invention. The back side refers to that side of the backplane that does not accept Peripheral Boards that comply with the CompactPCI Specification. Further, the back side of he backplane is the side that is adjacent to the rear of the industrial computer chassis. This particular backplane contains two modular backplane segments 111 and 112 and a power supply segment 120. The backplane will always contain at least one power supply segment and at least two modular backplane segments. The segments are 285 mm long or 6.5U. The dimensions 3U and 6U are outlined in the CompactPCI Specification. This size of backplane allows installation of 6U Peripheral Boards and 6U power supply modules. The additional 0.5U of height is used to accommodate the power connections on The backplane segments. All backplane segments are 8 layer printed circuit boards 113. The segments are affixed with screws to the bracket 123 thereby securing the backplane segments to the chassis of the industrial computer. There is normally a second mounting rail at the base of the backplane segments, with respect to FIG. 1, that is not shown. Approximately every second mounting hole an the backplane segment is connected to digital ground. The remaining holes are electrically isolated for use when a connection between logic ground and chassis ground is not desired.

Modular backplane segment 112 forms the 'beginning' or first primary backplane segment, which includes a primary bus. Modular backplane segment 111 forms the 'ending' or final secondary backplane segment, which includes a secondary bus. The 'beginning' segment is the first pi modular backplane segment and the 'ending' segment is the last secondary modular backplane segment. The designation of primary and secondary is made with respect to the bridge module. A primary modular backplane segment will include a primary bus and a bridge module that acts as a Peripheral Board on this backplane segment. A secondary modular backplane segment includes the secondary bus and a bridge module that acts as a System Slot Board on his backplane segment.

There is also a possibility of one or more 'middle' segments lying between the 'beginning' and 'ending' segments. 'Middle' segments will be connected to two bridge modules. A 'middle' segment will be a primary backplane segment with respect to one bridge module and a secondary backplane segment with respect to the other bridge circuit.

There are slots of two different lengths found on the backside of the modular backplane segments. Slot 114 contains five connectors, J1–J5, and is a 6U CompactPCI slot. Referring to FIG. 1 connector J1 is located at the bottom of the backplane while J5 is at the top of the backplane next to the mounting rail 123. Slot 115 contains three connectors, J3–J5.

There are two different types of connectors used. Long-tail connectors have pins which extend through the PCB to contact the connector on the opposite side of the backplane segment. Thus there is a single continuous contact through the PCB. This allows connections to be made from the front side and/or the back side of the backplane. Long-tail connectors are used for the J1 and 32 connectors of the System and Bridge Slots (117 and 114, respectively). From This point forward any discussion of the System or Bridge Slot will assume a single slot whether it is being connected from the front side or the back side of the backplane segment. Long-tail connectors are also used for the J3–J5 connectors for all slots of 6U backplane segments.

Short-tail connectors do not have pins that extend through the backplane. Therefore short-tail connectors allow connections to be made from one side of the backplane. Short-tail connectors are used in all locations that do not use long-tail connectors.

The slots of 3U backplanes are identical to those of the 6U backplanes with the exception that J3–J5 are not present.

Again referring to the back side of the modular backplane shown in FIG. 1, there are two types of connections that may be made to the rear of the backplane. First, a rear mounted bridge module 116 can be connected to two adjacent modular backplane segments to form a bridge between them. The bridge module connects to the J1 and J2 connectors of the Bridge Slot on the primary segment and to the J1 and J2 connectors of the System Slot of the secondary segment. Second, rear transition modules can be connected to the back side of backplane segments. Rear transition modules are defined in the CompactPCI Specification. Such a transition module may only use connectors J3–J5 and may be installed in any slot. Transition modules can not be used with 3U modular backplanes since connectors J3–J5 are not present. Since transition modules and rear bridge modules connect to different connectors, they may both be installed at the same time.

The number of five-connector (J1–J5) slots on the back side of a modular backplane segment that can be used for the connection of rear mounted bridge modules is determined by the number of slots on the front side of the backplane segment. A modular backplane segment will always contain a five-connector slot in the 'rightmost' slot position, slots 117 and 124. This slot is the System Slot. The 'beginning' modular backplane segment 112 will have a System Slot Board inserted on the front side of the backplane segment in this slot (219 of FIG. 2). There is no bridge module connected to this slot for the 'beginning' segment 112. A bridge module connected to connectors J1 and J2 of System Slot 117 of the 'ending' segment 111 and will act as a System Slot Board to tat backplane segment.

For modular backplane segments with six or seven slots on the front side of the backplane segment there is a second slot called the Bridge Slot, 114 and 118, that also has long tail connectors in positions J1 and J2 for connection of a bridge module. The Bridge Slot 118 of 'beginning' modular backplane segment 112 has a bridge module 116 connected to it. The bridge acts as a Peripheral Board on this modular backplane segment. A standard CompactPCI Peripheral Board may be installed on the front side of the backplane segment directly opposite to slot 118. The ability to mount boards on the front side of backplane segments directly opposite to slots that contain bridge modules will be discussed in greater detail in conjunction with the discussion of the operation of the bridge module.

Figure 2:
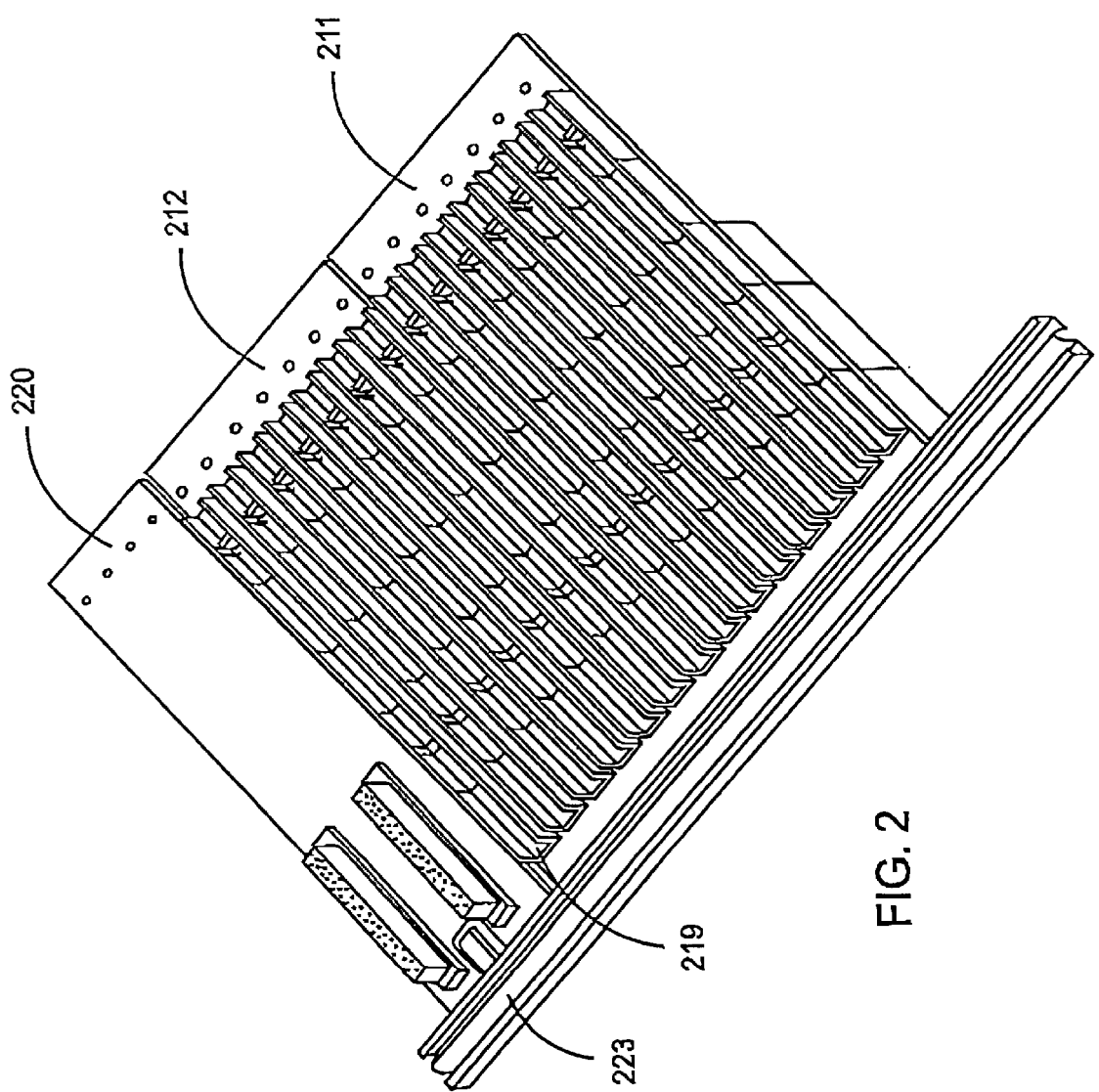
FIG. 2 is a perspective view of the front of the backplane assembly of FIG. 1.

The front side of the modular backplane is shown in FIG. 2. There are seven slots on both the 'beginning' 212 and 'ending' 211 backplane segments for the acceptance of front loading boards. These are single wide (4HP) slots for the acceptance of 6U CompactPCI compliant Peripheral Boards. Slot 219 is the 'rightmost' or System Slot. It is directly opposite to slot 124 (FIG. 1) on the back side of modular backplane segment 212. A System Board is inserted in slot 219. This board acts as a System Slot Board for the entire modular backplane. Since backplane segment 211 is an 'ending' segment, its rightmost slot 219 accepts CompactPCI Peripheral Boards. System Slot Boards are not required on secondary modular segments as the bridging module provides system functions for these segments.

Figure 3:
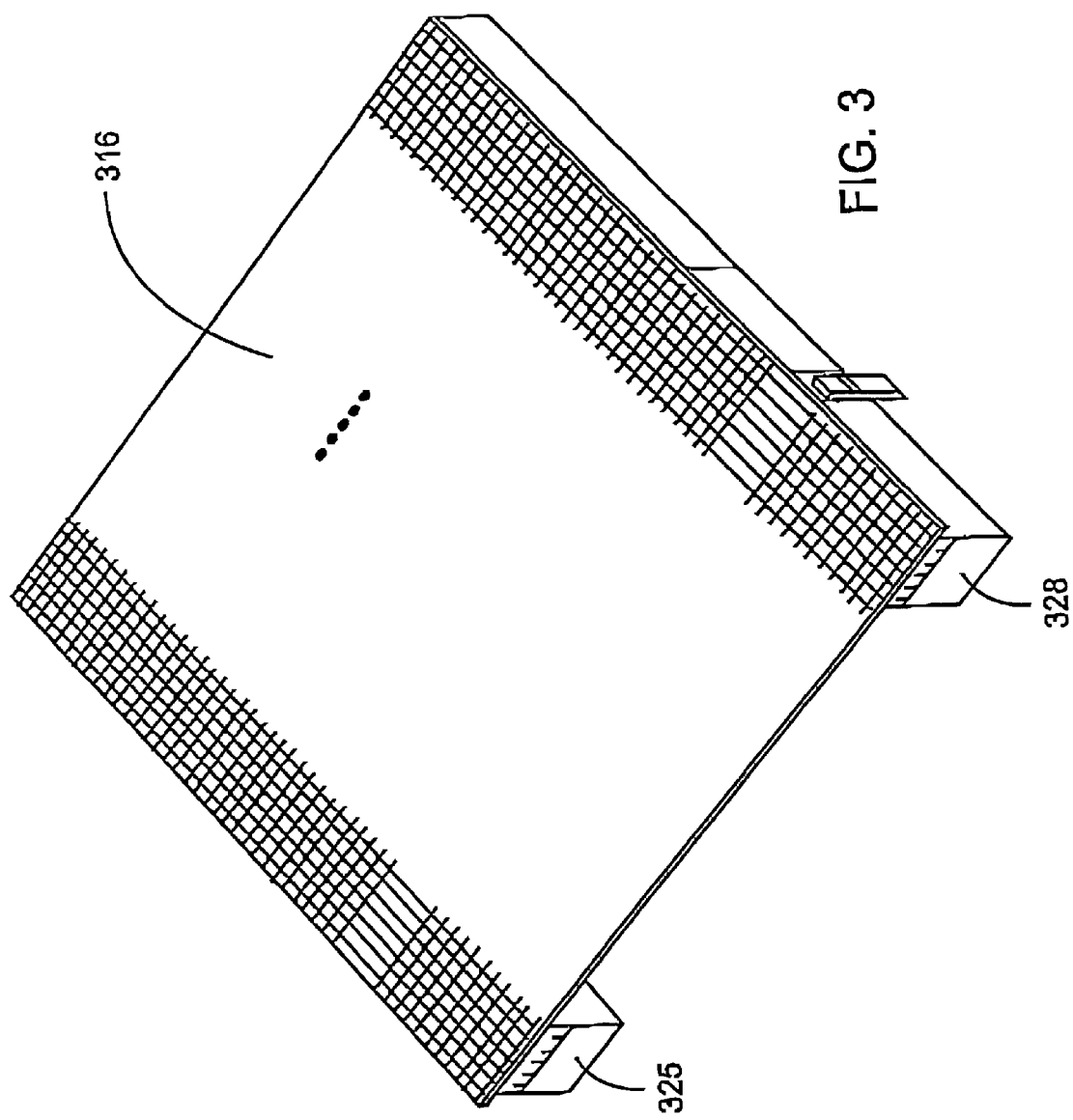
FIG. 3 is a perspective view of the rear of the bridge module of the backplane assembly of FIG. 1.
Figure 8A:
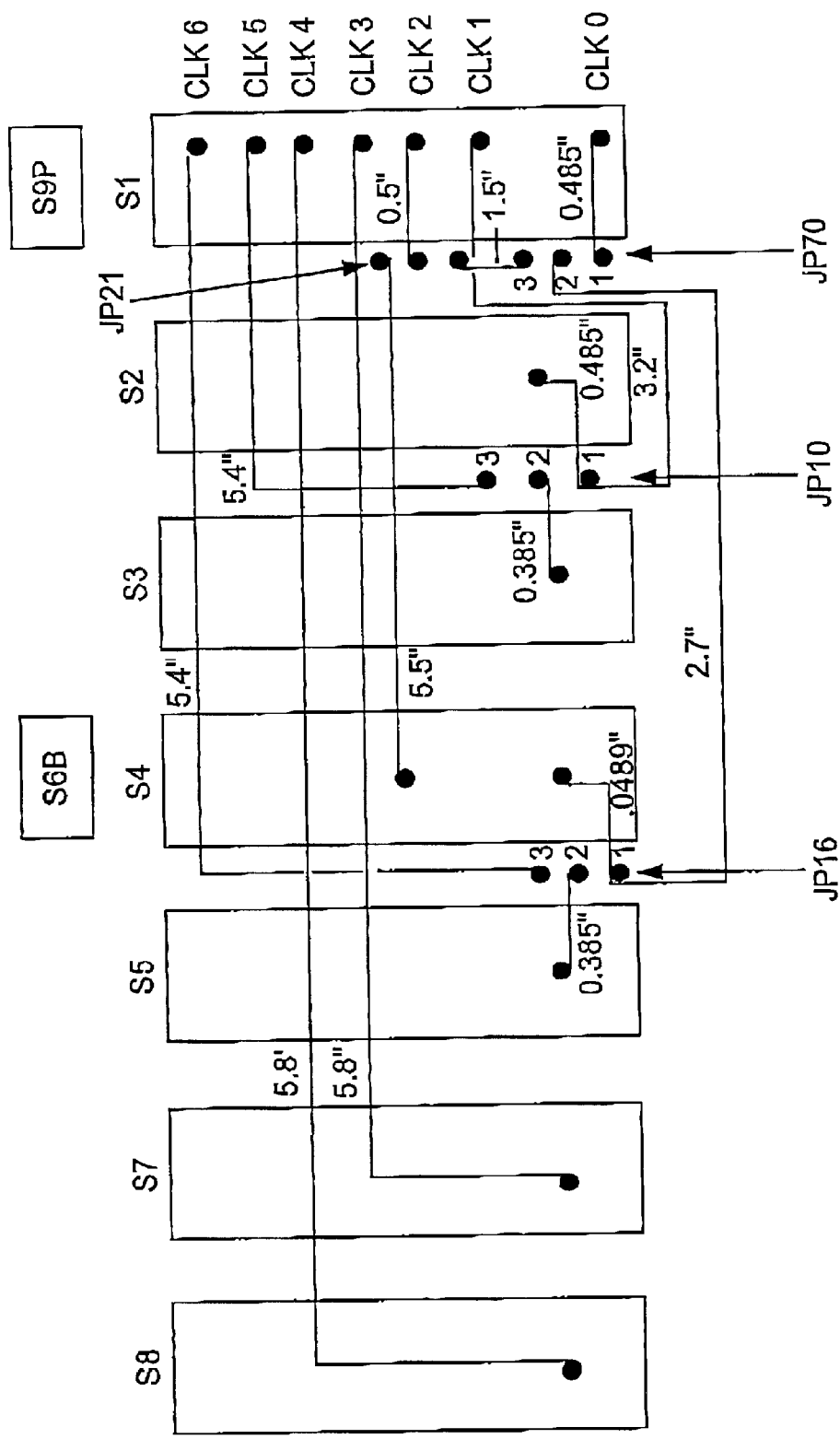
FIGS. 8(a)–(e) fare clock routing diagrams for the possible sizes of modular backplane segments.
Figure 8B:
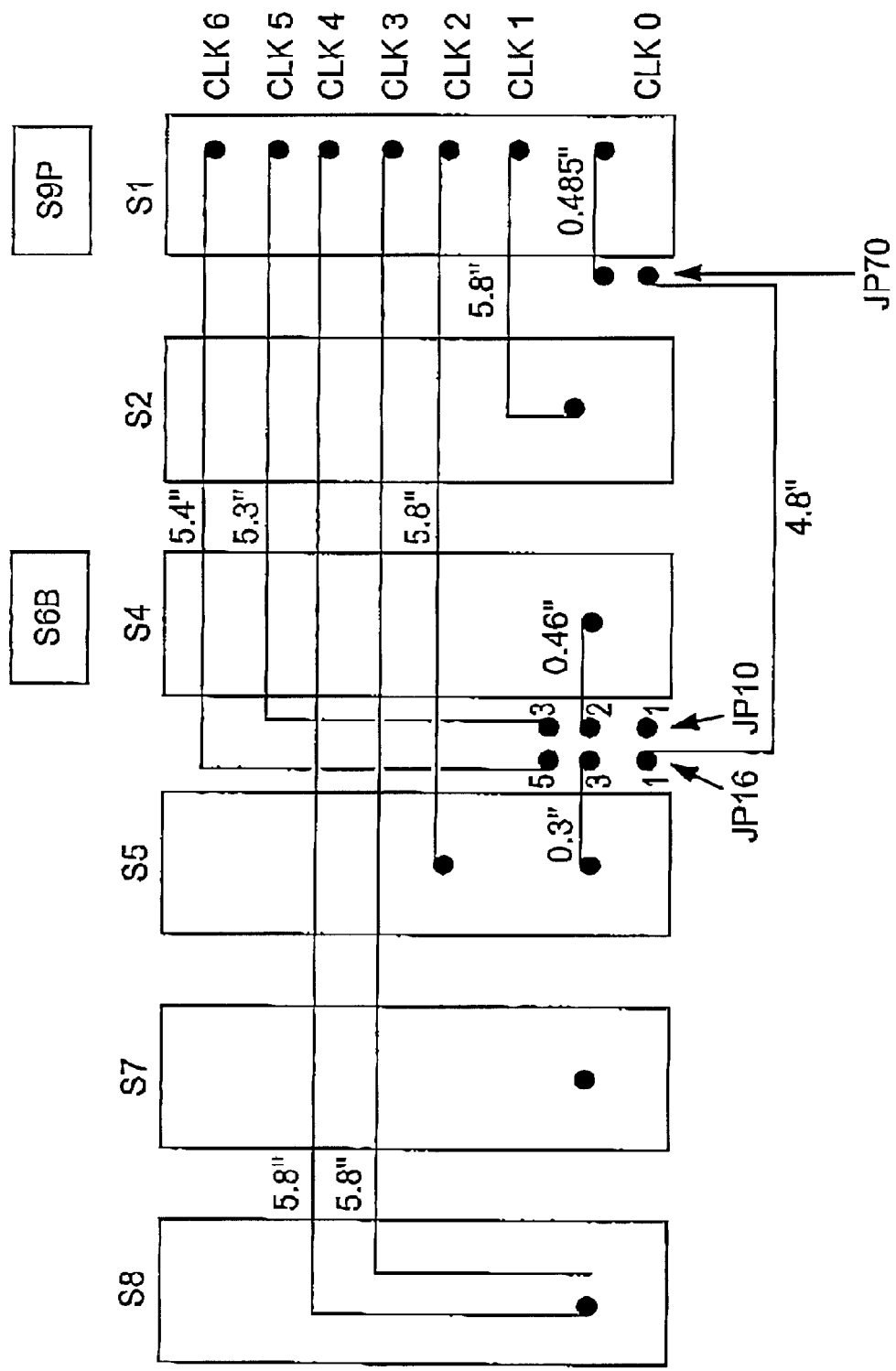
Figure 8C:
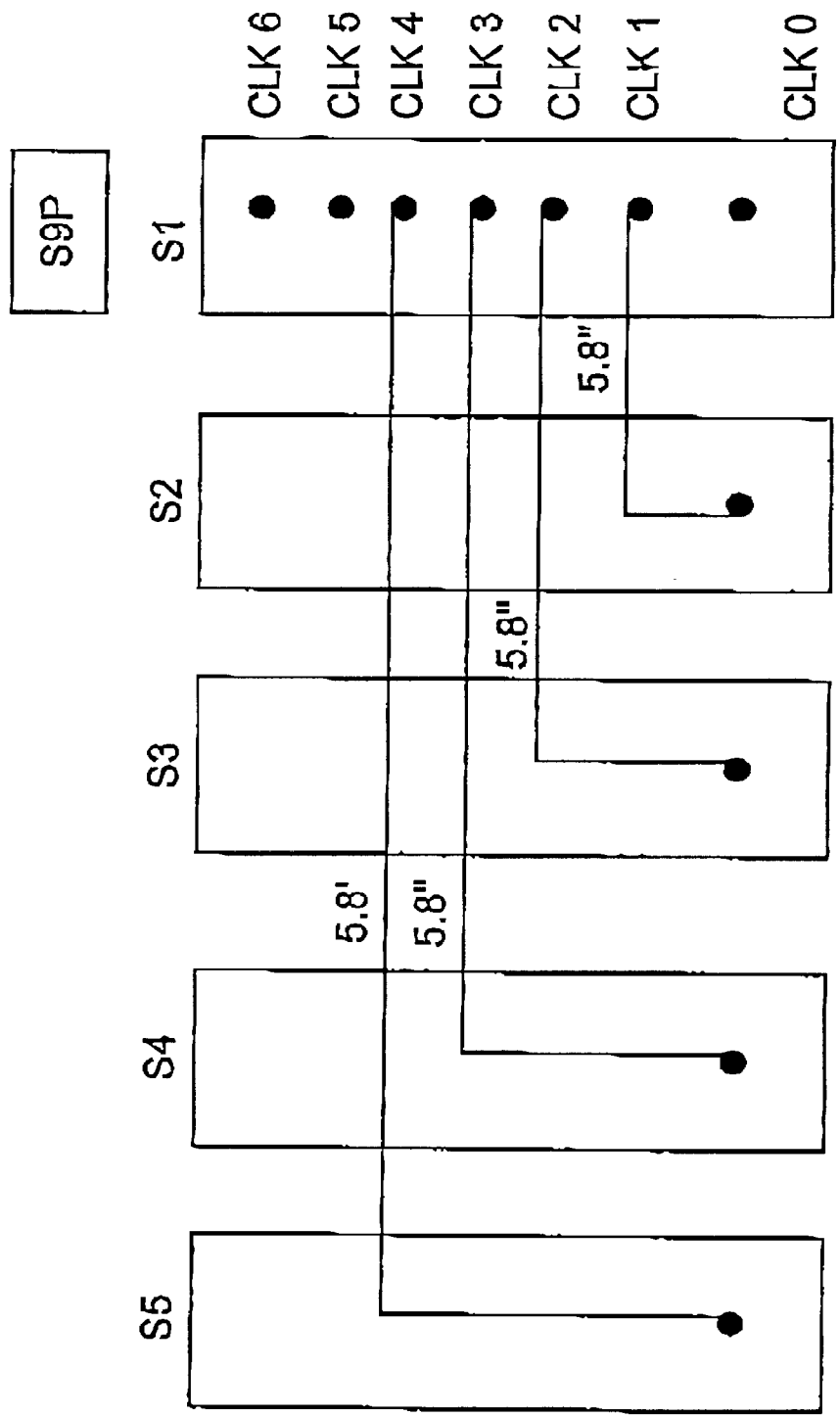
Figure 8D:
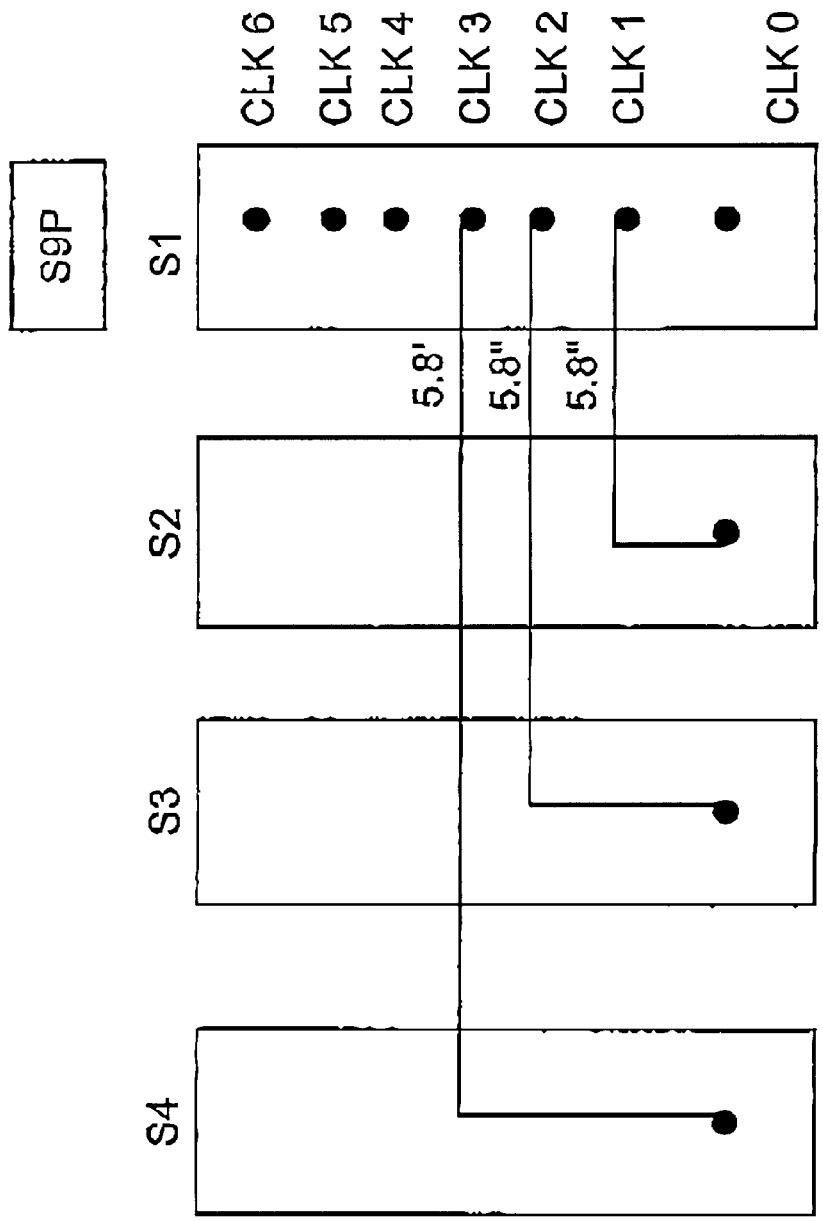
Figure 8E:
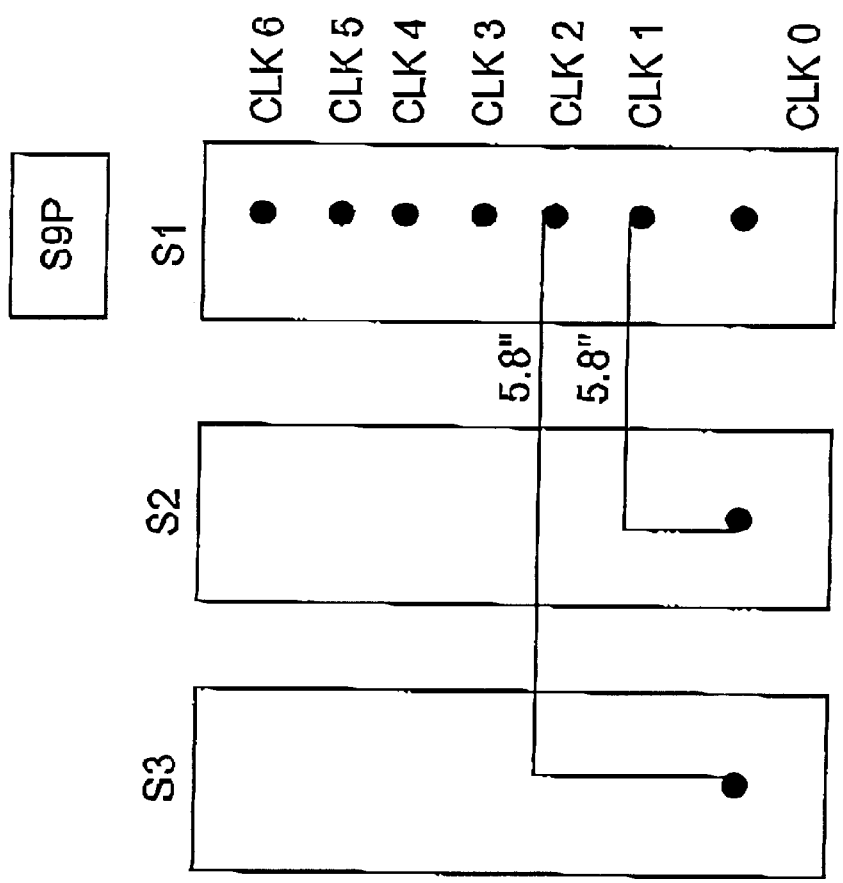

FIG. 3 shows the back side of the bridge module 316 which is used to bridge two adjacent backplane segments. The bridge module has a major surface that is essentially square. There are no components located on the back side of the bridge module. The module is designed such that it lies parallel to the backplane, thus requiring little space for its implementation. The connectors, 325 and 328, for connecting The bridge module 316 to the backplane segments are standard CompactPCI 2 mm connectors. They are located along opposite edges of the five-slot wide bridge module.

FIG. 4 shows the front side of bridge module 416. The principal integrated circuit on the bridge module is the bridging IC 426. In this preferred embodiment an Intel (formerly Digit Equipment Corporation) 21154 PCI-PCI Bridge IC is used. This is a very common bridge IC in the an. The connectors, 425 and 428, of the bridge module 416 are keyed 427 such that the bridge circuit can not be placed incorrectly with respect to the connectors of the modular backplane segments. The bridge module 416 is connected to the backplane segments shown in FIG. 1 such that connector 425 is inserted in slot 118 and connector 428 is inserted in slot 117. A signal traveling from the 'beginning' segment (112) to the 'ending' segment (111) travels from right to left with respect to the bridge module 416 depicted in FIG. 4.

When the bridge module is connected to the rightmost slot (117 in FIG. 1) of a given modular backplane segment it acts as a System Slot Board for that modular backplane segment and consumes one available electrical load. When the bridge module is connected to the Bridge Slot (118 in FIG. 1) of a given modular backplane segment it acts as a Peripheral Board on that modular backplane segment and consumes one available electrical load. Therefore 'beginning' and 'ending' segments can have up to seven slots and 'middle' segments can have up to six slots for the acceptance of front loading boards.

As mentioned previously long-tail connectors are used in the J1 and J2 connector positions of the System Slot and the Bridge Slot. The long-tail slots allow the same connections to be made from the front side or the back side of the backplane segment. Thus the pin out of the bridge module which is attached to the J1 and J2 connectors of these two slots will be the pin out seen by the board attached to the front side of the backplane segment in these locations.

FIG. 5 (a) is a pin out of connectors J2 ad J49 which attach to the Bridge Slot (425 of FIG. 4). FIG. 5 (b) is a pin out of connectors J50 and J51 which attach to the System Slot (428 of FIG. 4).

The front side of the power supply segment is shown in FIG. 6. The power supply segment 620 provides the power for all of the modular backplane segments. The two connectors 629 allow the use of removable power supply modules. These connectors are specified in the PICMG 2.11 R1.0 Compact PCI Power Interface specification and are suitable for connection to a 500W power supply, in conformance with the CompactPCI Specification. Over connectors, such as DIN-M can be used, as will occur to those of skill in the art. In addition, power supply backplane 620 complies with the 6U form factor prescribed by the CompactPCI Specification.

In monolithic backplanes, power is distributed through the backplane via one or more dedicated layers of metallization within the PCB. In the current invention power must be distributed outside of the PCB. Power supply backplane 620 includes five ATX connectors (ATX Specification Version 2.01, Intel Corporation, February 1997). The ATX connectors comply with e ATX standard to a limited extent. A standard ATX power supply could be used to power a modular backplane segment. A modular power backplane could not be used to power a standard ATX device (e.g. an ATX motherboard).

Detail of the back side of the power supply segment is shown in FIG. 7 It provides +3.3 V, +5 V and ±12 V to the CompactPCI backplane segments. The output connectors 721 and the cables 730 connect the power supply segment to the other backplane segments. Power is input through a 2×3 ANT Mate-N-Lcock connector 731. The power is output to the backplane segments via the five ATX-style connectors 721. Connections are made to similar connectors on the backplane segments by cables 730. There are twenty 18–20 gauge cables for each backplane segment. If higher currents are required than what can be handled by the ATX-style connectors, power laps 732 can be used.

Thirdly, a derailed description of the operation of the invention is provided. The novel aspects of the operation of the invention largely relate to the modularity of the backplane. The separation of the backplane into physically separate backplane segments does not allow any connections between backplane segments through the PCB. The physical separation has implications to the routing of signals and the routing of power. The modularity also requires that backplane segments be able to act as primary or secondary backplane segments. This flexibility of role will be considered first.

Referring to FIG. 1, a bridge module is connected to the 'rightmost' slot 117 of the 'ending' modular backplane segment 11. In this configuration a Peripheral Board may be installed on the font side of the modular backplane segment in the slot opposite slot 117. However, the modular backplane segment 112 that forms the 'beginning' segment of the backplane does not have a bridge module attached to system slot 124. Rather there is a System Slot Board inserted on the front side of the backplane (219 of FIG. 2). The ability of a modular backplane segment to accept either a System Slot or Peripheral Board in the 'rightmost' slot is due to the interconnections of several signals.

One of these signals is the System Slot Identification or SYSEN# signal. The CompactPCI Specification calls for is pin to be grounded in the backplane for the System Slot allowing this slot to be identified by a board inserted in it as a System Slot. The System Slot is the 'rightmost' slot, 117 and 124 of FIG. 1. In the current invention the SYSEN# signal is connected to GND tough a small resistance on the backplane segment If a bridge module is installed in slot 117 or 124 it will connect the SYSEN# signal to V(I/O) and a board installed in this slot on the front side of the backplane will see a logical high voltage on SYSEN#, indicating that the slot can accept a Peripheral Board. If there is no bridge module installed in slot 117 or 124, a board installed on he front side in the slot opposite its slot will see a logical low voltage on SYSEN#, indicating that the slot is a System Slot. This allows either a System Slot Board or a Peripheral Board to be installed in this slot on the front side of the backplane, depending on the system configuration.

When a bridge module is connected to the Bridge Slot of a primary backplane segment its electrical interface is the same as that of a standard Peripheral Board except for the following signals. First, no connection is made to CLK, REQ#, and GNT# since these pins are used by the Peripheral Board that resides in front of the bridge. A second set of CLK, REQ#, and GNT# are provided for the bridge on the CLK3, REQ5# and GNT5# pins, respectively. These pins are reserved for System Boards, so any peripheral component that is installed in front of the bridge will leave these pins unconnected.

Second, no connection is made to the IDSEL signal, since the Peripheral Board that resides on the front side of the backplane segment, opposite the bridge module uses this signal. The IDSEL input of e bridge IC is directly connected to one of the CompactPCI address/data signals (AD27), the primary side of the bridge always appears as logical slot #6.

Third, connections are made to FAL#, DEG#, and PRST#. These signals are connected directly from the pi bus to the secondary bus and ensure that the power supply and reset status are the same for all of the bus segments that are bridged together. These signals are not associated with the 'bridging' of two buses. Rather, they are 'auxiliary' to bridging functions, yet due to the modularity of the backplane they must be conveyed through the bridge. They would normally be connected through the PCB.

There are also some exceptions to the standard connections for the bridge module when the module is connected to the 'rightmost' slot and acts as a System Board for the secondary backplane segment. First, the CLK, RFQ#, and GNT# pins are driven by the bridge. This provides the required clock and arbitration signals for the Peripheral Board that is installed on front side of the backplane segment directly opposite the bridge.

Second, the IDSEL signal is driven directly by SAD24 (one of the address/data signals of the secondary CompactPCI bus). This identifies the Peripheral Slot in front of the bridge as logical slot #9. This logical slot number was chosen because it has the same interrupt mapping as logical slot #1. (The PCI interrupt signals are connected in a rotating pattern such that logical slots 1, 5, 9, etc. are the same, slots 2, 6, 10, etc. are the same, slots 3, 7, 11, etc. are the same, and slots 4, 8, 12, etc. are the same.) This slot becomes logical slot #1 when there is no bridge present and a System Board is installed in this slot. The use of logical slot #9 does not violate the limit of 8 slots per CompactPCI segment since there are still 8 or fewer electrical loads on the bus.

The secondary bus interrupt signals (SINTAN, SINTBN, SINTCN, and SINTDN) are each connected directly to one of the primary bus interrupt signals (PINTAN, PINTBN, PINTCN, and PINTDN). This mapping is fixed for all combinations of modular backplane segments.

The CompactPCI Specification outlines requirements for clock signals on the backplane. It requires that all clock traces be matched in physical length in all configurations. IT fisher outlines a maximum skew of 2 ns for a system running at 33 MHZ Backplane clock skew is created by differences in trace lengths on the backplane. Net topology is also critical. Clock traces must not split into two or more traces in any configuration. The possibility of having a bridge module connected to one or two slots on the back side of a given backplane can cause difficulties for the distribution of clock signals on the backplane segment. FIGS. 8(*a*) through (*e*) are clock routing diagrams for modular backplane segments with seven through three slots, respectively the clock routing for a segment with two slots is the same as that for a segment with Three slots as shown in FIG. 8(*e*). The lengths of clock traces are noted on the diagram.

Jumpers are provided on backplane segments for configuring the distribution of clock signals to the slots. There are four jumpers, JP10, JP16, JP21 and JP70, for the distribution of clock signals of a seven slot backplane segment and three jumpers, JP16, JP10 and JP70, on a six slot backplane segment. These are noted in FIGS. 8(*a*) and (*b*), respectively. The jumper configuration for a seven slot and six slot backplane segment should be as outlined in FIGS. 9(*a*) and 9(*b*), respectively.

There are also special requirements when one clock signal must be shed by two Peripheral Boards. This difficulty arises as most early CompactPCI System Slot Boards provide only five independent clock signals while more recent System Slot Boards provide seven clock signals. When an old SYSEN Slot Board is used in a backplane segment with more than five Peripheral devices, some physically adjacent slots must share a clock signal as described in the CompactPCI Specification. With proper configuration of the jumpers, the clock signals can be configured to comply with the CompactPCI Specification for any backplane/bridge/System Slot Board configuration.

The two final signals that will be discussed are the RBQ64# and GNT64# signals. These signals of every slot of every modular backplane segment are each connected to 2 resistors. Selectively loading these resistors allows each slot to be individually configured for 64- or 32-bit operation. For 64-bit operation, these signals must be bused. For 32-bit operation, these signals must be individually pulled up at each slot. By is loading these resistors appropriately, any combination of 32- and 64-bit slots can be supported using the same printed circuit board for the backplane segment.

The bridge module also cones numerous resistors and capacitors. The resistors are mostly series termination and pull-up resistors tat are required by the CompactPCI Specification. There are however pull-up resistors which are connected to the upper 32-bits of the primary bus. When a 32-bit System Slot Board is used these signals will not necessarily be driven at all times and they must not be allowed to float.

The bused reserved pins (BRSVPxxxx) from the primary and secondary buses may be connected between primary and secondary backplane segments or left unconnected via resistor loading options.

Figure 10:
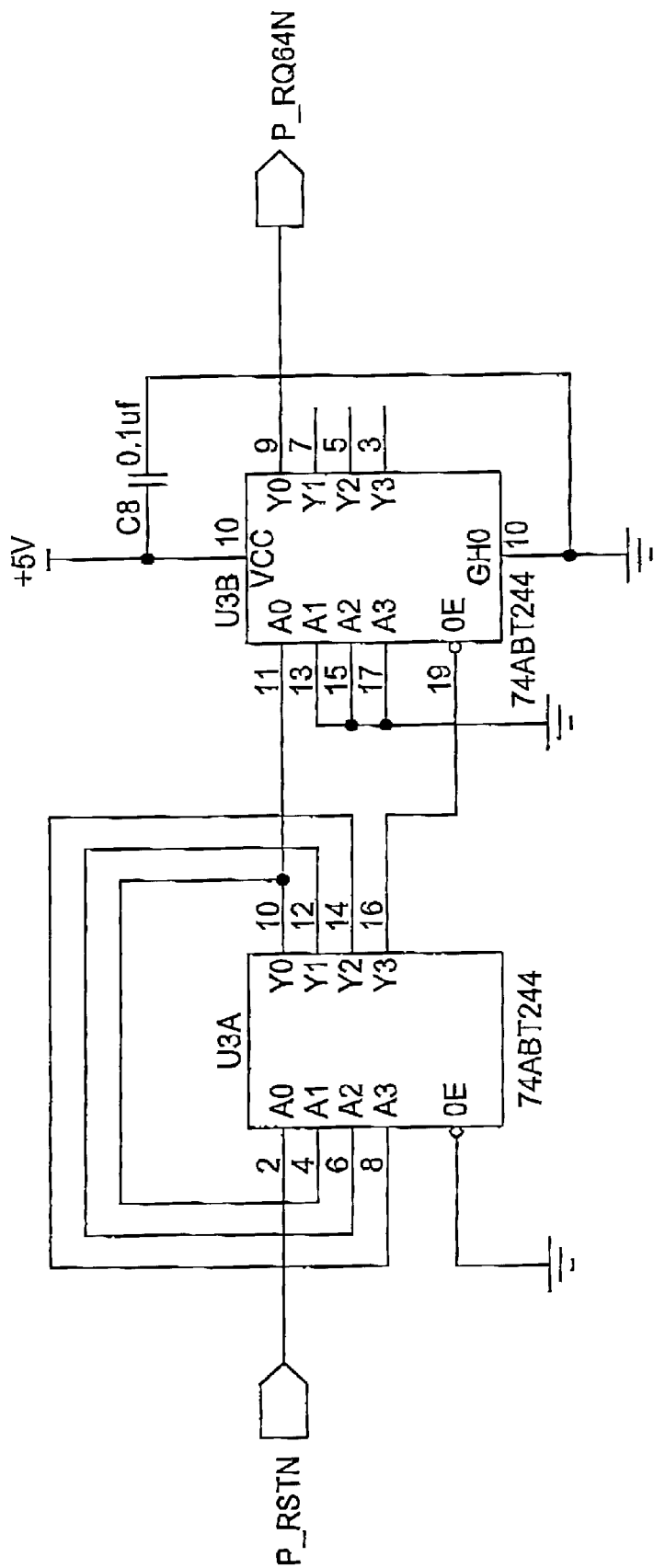
FIG. 10 is a schematic diagram of the circuitry surrounding the octal buffer/line driver of the bridge module.

The bridge module of the current invention allows modular backplane segments with 32- and 64-bit buses to be bridged in any combination. The bridge module also contains an octal buffer/line driver. FIG. 10 is a schematic diagram showing the connections to this IC. The circuitry surrounding it is used to initialize the primary CompactPCI bus so that 64-bit operations will be allowed between peripherals even though the System Slot Board may only be capable of 32-bit operations. It holds REQ#64 low as RST# is deasserted, indicating to the Peripheral Boards that they are installed in a 64-bit backplane.

The Geographic Address (CA) signals as described in the CompactPCI Specification are used to provide boards with an indication of their physical location in a chassis. The signals can be individually configured for each slot via a series of jumpers (or a resistor loading option) to suit any physical arrangement of backplane segments and bridges. These pins are user-configurable based on the arrangement of backplane segments.

The final aspect of the operation that will be discussed is the operation of the power supply segment(s). Like other elements of the current invention the power supply's operation is affected by the modularity of the backplane. It is possible for each backplane segment to receive power from an independent power supply, although this would not be common practice.

The bridge module is designed such that the power supplies of the modular backplane segments it bridges are isolated. The +3.3 V, +5 V and ±12 V supplies are not directly connected across the bridge. The primary and secondary supplies are capacitively coupled across the bridge to preserve the integrity of signals as they pass from one power domain to the other. The isolation of power domains protects the bridge module in cases of power supply failure on either segment. If a power supply for one segment did fail is segment would try to draw power from the other segment through the bridge which may damage it. It is also very important to ensure that two backplanes bridged together are always powered on and off together. If this is not the case there could be excessive current drawn and there is again the possibility damage to the bridge module.

The bridge module draws all of its power from the primary bus. The only exception to this is V(I/O) from the secondary bus, which is directly connected to the bridge IC for sensing purposes and used by pull-up resistors on the secondary bus. V(I/0) may be +3.3V or +5V on either the primary or secondary bus. Any combination of these two voltages is acceptable as the bridge module will automatically detect the bus voltage and adjust its I/O levels appropriately.

There are three power supply status and control signals prescribed by the CompactPCI Specification; INH#, DEG# and FAL#. ATX power supplies have analogous signals for INH# and FAL# but there is no analogous signal for DEG#. The INH#, FAL# and DEG# signals are directly connected to pins 14, 8 and 9 of the ATX connectors, respectively. These signals are normally carried though the backplane. In the current invention the DEG# and FAL# signals are bused across the bridge module in the absence of a continuous connection through the backplane. The INH# signal is not bused by the bridge module.

A problem may arise with the FAL# signal when multiple ATX power supplies are used together and one supply tried to drive this signal low. A small (100 ohm) resistor is placed in series with FAL# to limit the current should multiple power supplies be used and one supply tried to drive this signal low.

Figure 11:
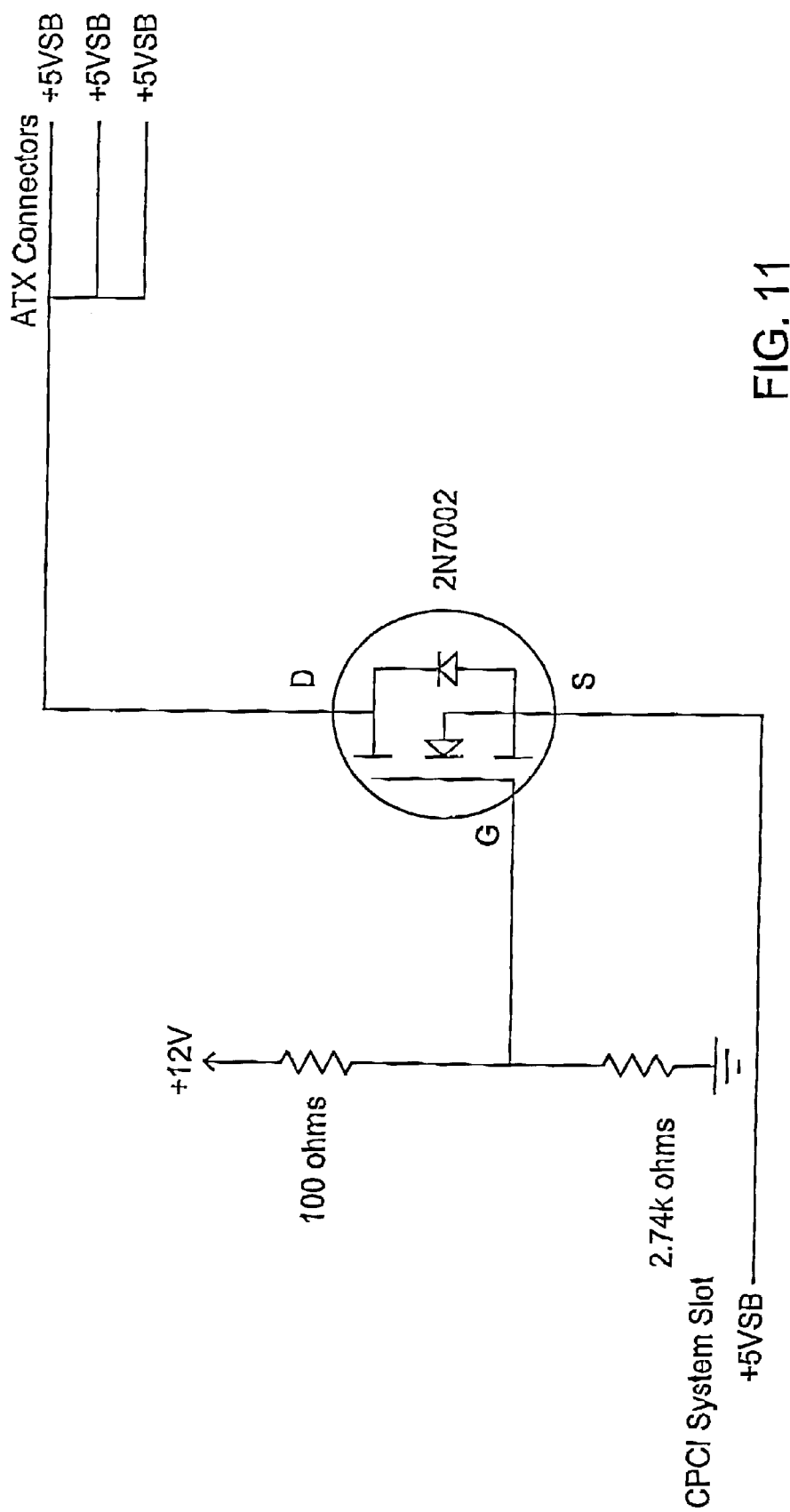
FIG. 11 is a schematic diagram of the FET that is placed in series with the DEG# signal.

As noted above there is no analogous signal to DEG# for ATX power supplies. In the current invention this signal is carried on pin 9 which is a +5 V standby supply. This voltage remains on after the supply is turned off allowing the inputs to be driven into dead logic. In order to prevent this situation an enhancement mode Field Effect Transistor (FET) is placed in series with the DEG# signal. A schematic diagram showing the implementation of the FET is shown in FIG. 11. When the ATX power supply is turned off the +12V supply is turned off which tuns off the FET and disconnects DEG# from the +5V supply. This concludes the detailed description of the structure of the invention.

Because power must pass through cables and connectors when being distributed to the modular backplane segments there may be a voltage drop between the power supply module and a given backplane segment. Such a drop is undesirable. In order to provide consistent power to the backplane segments the voltage must be tested for any drops and adjustments made in the output from the supply. The current invention
provides sensing capabilities for +3.3V, +5V and +12V supplies. For +3.3V and +5V, one terminal for each of these supplies and one ground terminal of the ATX connector are used for sensing. Sensing takes place at the power connectors of the modular backplane. Since there are several ATX connectors on each power backplane, there will be multiple voltage sensing points. In order to accommodate this each sense line passes through a 1 ohm series resistor before being connected to the power supply input. In this way, the power supply input will reflect the weighted average of all of the sense inputs.

The sensing of a +12V supply is slightly different since there is only one terminal on he ATX connector for the +12V supply i.e. there are no available terminals for sensing. A jumper has been provided to connect the −5V terminal of the ATX connectors to the +12V supply. When the jumper is installed the −5V terminal can be used for sensing the +12V supply. The jumper should only be installed if +12V sensing is required.

Fourthly, the above embodiment has been outlined for the case of a 6.5U backplane segment that accepts 6U boards. However, the invention can be readily practiced with backplane segments that have a height of 3.5U that accept 3U boards. The preferred embodiment has described the use of a single power supply segment for the modular backplane. It is also possible to use multiple power supply segments or one or more power supplies that are not contained in the backplane.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A modular CompactPCI compliant backplane for an industrial computer comprising:

a first modular backplane segment with a front side and a back side, the front side containing slots for the insertion of one System Slot Board and up to six Peripheral Boards;

a second backplane segment with a front side and a back side, the front side containing up to seven slots for the insertion of Peripheral Boards;

a bridge module containing circuitry to bridge the first and second modular backplane segments such that a continuous PCI bus is formed across the modular backplane segments; and a power supply to provide power to all of the segments of the backplane.

2. A modular backplane according to claim 1 wherein the bridge module is connected to the back side of the modular backplane segments.

3. A modular backplane according to claim 1 wherein the backplane segments have a height of 6.5U.

4. A modular backplane according to claim 1 where the backplane segments have a height of 3.5U.

5. A modular CompactPCI compliant backplane for an industrial computer comprising:

a first modular backplane segment with a front side and a back side, the front side containing slots for the insertion of one System Slot Board and up to six Peripheral Boards;

one or more intermediate modular backplane segments with a front side and a back side, the front side containing slots for the insertion of up to six Peripheral Boards;

a final backplane segment with a front side and a back side, the front side containing up to seven slots for the insertion of Peripheral Boards;

bridge modules containing circuitry to bridge adjacent modular backplane segments such that a continuous PCI bus is formed across the modular backplane segments; and a power supply to provide power to all of the segments of the backplane.

6. A modular backplane according to claim 5 wherein the bridge modules connect to the back side of the modular backplane segments.

7. A modular backplane according to claim 5 wherein the backplane segments have a height of 6.5U.

8. A modular backplane according to claim 5 wherein the backplane segments have a height of 3.5U.

9. A modular backplane segment for use in a CompactPCI compliant backplane having a front side, a back side and one or more interconnecting bridge modules for transmitting all signals between backplane segments comprising:

a front side with up to seven slots for the insertion of up to seven front loading boards; and a back side with up to two slots for the insertion of up to two bridge modules for the connecting adjacent backplane segments.

10. A CompactPCI compliant modular backplane segment according to claim 9 wherein all pins of the connectors for accepting bridge modules are directly connected to pins of connectors on the font side of the backplane segment for the acceptance of either a System Slot Board or a Peripheral Board.

11. A bridging module for use in a modular CompactPCI compliant backplane for an industrial computer having two or more modular backplane segments, each segment having a PCI compliant bus, a front side with up to seven slots for boards and a back side with up to two slots for receiving bridging modules, the bridging slots being connected to the backplane segment bus comprising:

a major surface;

first and second connectors positioned opposite one another on the major surface and adapted to be inserted into the bridge slots of adjacent backplane segments, such that the major surface of the bridge module will be parallel to the backplane; and an integrated circuit connected to the connectors for receiving and processing and transmitting signals between buses and for receiving, processing and transmitting auxiliary signals between two adjacent modular backplane segments.

12. The bridge module according to claim 11 wherein the bridging module includes means for converting a front side slot from a System Board slot to a Peripheral Board slot.

13. A bridge module according to claim 11 wherein the auxiliary signals are DEG# and FAL# signals.

14. A bridging module according to claim 11 wherein the integrated circuit is an Intel 21154 PCI-PCI bridging integrated circuit.

15. A bridge module to claim 11 wherein the integrated circuit can process 32-bit and/or 64-bit signals.

* * * * *